United States Patent [19]
Itoh et al.

[11] Patent Number: 5,804,296
[45] Date of Patent: Sep. 8, 1998

[54] CELLULOSE ESTER COMPOSITIONS AND SHAPED ARTICLES

[75] Inventors: Masanori Itoh, Kashiwa; Akira Miyazawa, Ashiya; Teruo Aoe; Osamu Ikemoto, both of Okayama, all of Japan

[73] Assignees: Daicel Chemical Industries, Ltd; Tayca Corporation, both of Osaka, Japan

[21] Appl. No.: 567,023

[22] Filed: Dec. 4, 1995

[30] Foreign Application Priority Data

Dec. 5, 1994 [JP] Japan .................................. 6-330022

[51] Int. Cl.$^6$ ........................................................ B32B 5/16
[52] U.S. Cl. ........................ 428/326; 428/292.1; 442/181; 442/327; 524/39
[58] Field of Search ........................... 524/39; 428/292.1, 428/326; 442/181, 327

[56] References Cited

U.S. PATENT DOCUMENTS

| | | | |
|---|---|---|---|
| 3,669,896 | 6/1972 | Preininger et al. | 252/301.3 W |
| 4,022,632 | 5/1977 | Newland et al. | 106/193 J |
| 4,073,764 | 2/1978 | Hemmerich et al. | |
| 4,443,535 | 4/1984 | Kiritani et al. | |
| 5,242,880 | 9/1993 | Irick, Jr. | 502/208 |

FOREIGN PATENT DOCUMENTS

| | | |
|---|---|---|
| 1073581 | 3/1980 | Canada . |
| 0 597 478 A1 | 5/1994 | Japan . |

*Primary Examiner*—Helen L. Pezzuto
*Attorney, Agent, or Firm*—Pillsbury, Madison & Sutro LLP Cushman Darby & Cushman Intellectual Property Group

[57] ABSTRACT

A composition comprises a cellulose acetate or other cellulose ester, and an anatase-type titanium oxide having (1) a specific surface area of not less than 30 m$^2$/g, (2) a primary particle size of 0.001 to 0.07 μm, or (3) a specific surface area of not less than 30 m$^2$/g and a primary particle size of 0.001 to 0.07 μm. For improving the photodegradability and the dispersibility, the surface of the titanium oxide may be treated with a phosphoric acid salt or other phosphorus compound, a polyhydric alcohol, an amino acid or others. Use of a low-substituted cellulose ester with an average substitution degree not exceeding 2.15 insures high biodegradability. The composition may further contain a plasticizer and/or an aliphatic polyester, a biodegradation accelerator (e.g. organic acids or esters thereof). The degradable cellulose ester composition is highly photodegradable and moldable and hence useful for the manufacture of various articles.

34 Claims, No Drawings

CELLULOSE ESTER COMPOSITIONS AND SHAPED ARTICLES

FIELD OF THE INVENTION

The present invention relates to a photolytic (photodegradable) composition comprising a cellulose ester, and a shaped article as produced using the composition.

BACKGROUND OF THE INVENTION

Regarding cellulose esters, a cellulose acetate is used in such applications as tobacco filters, various film articles, etc. while cellulose acetate butyrate and cellulose nitrate are employed in lacquers and other applications. Meanwhile, cellulose esters are decomposed or degraded by an ultraviolet ray, heat, air and outdoor conditions in general but their decomposition (degradation) rates are extremely low as compared with cellulose. Therefore, when a used article made of a cellulose ester is discarded outdoors, it retains its shape for a long time to cause environmental pollution. In particular, when high-consumption articles such as tobacco filters are discarded outdoors, the risk of pollution is significantly great. Moreover, such articles discarded outdoors can hardly be completely recovered and would entail an almost prohibitive cost of recovery. Disposal of articles by incineration involves large outputs of combustion heat which detract considerably from the serviceable life of the incinerator.

Japanese Patent Publication No. 26531/1982 (JP-B-57-26531), Japanese Patent Publication No. 36291/1982 (JP-B-57-36291) and Japanese Patent Publication No. 36292/1982 (JP-B-57-36292) disclose photolysis accelerator compositions for cellulose acetate. Japanese Patent Application Laid-open No. 37138/1976 (JP-A-51-37138) discloses an addition of an anatase-type titanium oxide having a crystal size of 50 to 1,500 Å and a specific surface area of not less than 20 m$^2$/g (e.g. 60 to 400 m$^2$/g) to a plastic for accelerating photolysis of the plastic. However, a cellulose ester is not exemplified as the plastic. Further, WO93/24685 discloses that a composition containing a cellulose ester and an anatase-type titanium oxide shows photodegradability. Addition of these titanium oxides, however, only provides a limited enhancement of photodegradability of the cellulose ester.

Furthermore, for producing a cellulose ester fiber containing a titanium oxide with high stability, such fiber is generally obtained by adding an aqueous dispersion of a titanium oxide in a concentration of not less than 45% by weight to a cellulose ester solution in a solvent (e.g. an acetone solution) to give a dope, and spinning this dope. In preparation of such dope, dispersion of the titanium oxide in water and stable spinning qualities (spinnability) of dope are required. However, the less the primary particle size of the titanium oxide is, the larger is the specific surface area of the particles and the more do the particles interact with each other, and hence, the stability of dispersion is apt to be sacrificed. Further, stable spinning of the dope is hardly conducted since fine particles of the titanium oxide in such dope are apt to be aggregated or coagulated.

Such cellulose ester as intact is poor in moldability (formability) as compared with a usual synthetic polymer. Therefore, a cellulose ester composition for an article application generally contains a plasticizer. By way of illustration, Japanese Patent Publication No. 16305/1968 (JP-B-43-16305) discloses a cellulose acetate article as produced using a polyester obtained from a glycol and an aliphatic dibasic acid and having a mean molecular weight of 700 to 4,000, as a polymer plasticizer for cellulose esters. This plasticizer has excellent compatibility with a cellulose acetate having a degree of acetylation of not less than 52% (degree of substitution of not less than 2.2).

In Japanese Patent Application Laid-open No. 276836/1986 (JP-A-61-276836), the present applicants proposed a cellulose derivative resin composition comprising a phthalic acid series polyester having a mean molecular weight of about 250 to 3,000, in order to improve the plasticity, nonvolatility and non-migration properties of the composition. As such cellulose ester, a cellulose ester having a degree of acetylation of not less than 52.2% (degree of substitution of not less than 2.2) is also employed in the composition.

The present applicants further proposed, in Japanese Patent Publication No. 36015/1986 (JP-B-61-36015), a composition for an article application comprising 10 to 25 parts by weight of a plasticizer relative to 100 parts by weight of a cellulose acetate with a degree of acetylation of 50 to 57% (degree of substitution of 2.1 to 2.5) and a degree of polymerization of 50 to 120 for enhancing or improving the thermal deformation resistance (heat distortion resistance) and cutting properties of the composition.

U.S. Pat. No. 3,781,381 discloses a mixture comprising an ε-caprolactone or other cyclic ester polymer as a modifier and a cellulose ester or other thermoplastic resin. This literature refers to a cellulose acetate with a degree of substitution of 2.5 as the cellulose ester (Example 14).

Moreover, U.S. Pat. No. 4,731,122 discloses a thermoplastic resin molding composition comprising 35 to 70% of cellulose acetate butyrate, 10 to 40% of a cellulose acetate, 15 to 30% of tributyl citrate, 5 to 30% of triethyl citrate and 1 to 10% of polyethylene glycol.

None of these known compositions, however, reflect a consideration of photodegradability and biodegradability, and actually all are lacking in photodegradability and biodegradability.

As a biodegradable resin composition containing a cellulose ester, Japanese Patent Application Laid-open No. 142344/1992 (JP-A-4-142344) discloses a biodegradable synthetic resin composition comprising 50 to 90% by weight of a cellulose ester, 0 to 40% by weight of a plasticizer and 5 to 30% by weight of an aliphatic polyester with a molecular weight of 500 to 3,000.

Yet, this composition does not reflect a consideration of photodegradability, and the biodegradability of this composition is largely dependent on the biodegradability of the plasticizer and aliphatic polyester added and the biodegradability of the cellulose ester as such is not remarkable. Moreover, because a citric acid ester or the like has to be used as the plasticizer, it is impossible to impart high moldability to the cellulose ester.

SUMMARY OF THE INVENTION

Accordingly, it is an object of the present invention to provide a highly photodegradable composition containing a cellulose ester.

Another object of the invention is to provide a cellulose ester composition which provides a dope with high dispersion stability and spinning properties (spinnability) even with a small particle size, and is highly photodegradable.

It is still another object of the present invention to provide a cellulose ester composition which insures high biodegradability in addition to high photodegradability.

A further object of the invention is to provide a cellulose ester composition which enables the use of a conventional plasticizer and yet provides for satisfactory moldability and photodegradability.

It is a still another object of the present invention to provide an article and fibrous article as produced using the above-mentioned composition.

A yet further object of the invention is to provide a cellulose ester composition which, if an article shaped by using such composition is discarded outdoors, may be easily decomposed in the environment to reduce the risk of pollution and an article as produced using the same.

As the result of intensive researches to accomplish the above objects, the inventors of the present invention found that a selective incorporation of an anatase-type titanium dioxide having a herein-defined specific surface area and/or mean particle size to a cellulose ester results in significantly high photodegradability of such cellulose ester. The present invention has been accomplished on the basis of the above finding.

Thus, the composition of the present invention comprises a cellulose ester and an anatase-type titanium oxide, wherein the titanium oxide has (1) a specific surface area of not less than 30 m$^2$/g, (2) a primary particle size of 0.001 to 0.07 $\mu$m, or (3) a specific surface area of not less than 30 m$^2$/g and a primary particle size of 0.001 to 0.07 $\mu$m. For improving and enhancing the photodegradability, the surface of the anatase-type titanium oxide may be treated with at least one component selected from the group consisting of phosphorus compounds or salts thereof, polyhydric alcohols and amino acids or salts thereof, or may support a transition metal, a novel metal or a compound of these metals.

When the titanium oxide is subjected to surface treatment with at least one component selected from the group consisting of phosphorus compounds or salts thereof, polyhydric alcohols and amino acids or salts thereof in a composition comprising a cellulose ester and an anatase-type titanium oxide, the specific surface area and/or the mean particle size of the titanium oxide is not particularly restricted.

The amount of the anatase-type titanium oxide may for example be about 0.01 to 20 parts by weight relative to 100 parts by weight of the cellulose ester. Incidentally, the titanium oxide is approved as a food additive and used for food, cosmetics, paints (coating materials) and other applications, and is highly safety to a living body. Unless otherwise indicated, the "titanium oxide" will occasionally be referred to as "titanium dioxide" in the present specification.

The average degree of substitution of the cellulose ester may for example be about 1 to 2.8, and the cellulose ester may be a variety of esters such as a cellulose acetate or other cellulose ester with an organic acid having 2 to 10 carbon atoms.

The cellulose ester composition may further contain at least one ingredient selected from the group consisting of a plasticizer, an aliphatic polyester and a biodegradation accelerator. The cellulose ester composition may also be a composition containing a plurality of cellulose esters varying in the degree of substitution. This composition practically contains a cellulose ester with an average degree of substitution of not more than 2.15 in a proportion of not less than 10% by weight based on the total amount of the cellulose esters. For further enhancing the biodegradability of the composition, it may also comprise a cellulose ester whose average degree of substitution is not exceeding 2.15 and at least 60% by weight of which is decomposed in 4 weeks when determined using the amount of evolved carbon dioxide as an indicator in accordance with ASTM D5209-91. This biodegradable composition may comprise a cellulose ester having an equivalent ratio of residual alkali metal or alkaline earth metal relative to residual sulfuric acid in the cellulose ester of 0.1 to 1.1., for example a cellulose ester having an average degree of polymerization of 50 to 250, an average degree of substitution of 1.0 to 2.15 and an equivalent ratio of residual alkali metal or alkaline earth metal relative to residual sulfuric acid in the cellulose ester of 0.1 to 1.1.

The cellulose ester composition has high moldability and is useful for production of various shaped articles. For example, such cellulose ester composition is useful for molding or forming a fiber, a mixed fiber or fibrous article containing such fiber.

DETAILED DESCRIPTION OF THE INVENTION

The cellulose ester includes, for example, organic acid esters of cellulose such as cellulose acetate, cellulose butyrate, cellulose propionate, etc.; inorganic acid esters of cellulose such as cellulose nitrate, cellulose sulfate, cellulose phosphate, etc.; and mixed esters such as cellulose acetate propionate, cellulose acetate butyrate, cellulose acetate phthalate, cellulose nitrate acetate and so on. These cellulose esters may be used independently or in combination. Among these cellulose esters, organic acid esters, preferably esters with organic acids each having about 2 to 10 carbon atoms, more preferably about 2 to 4 carbon atoms are preferred. Particularly, cellulose acetate can preferably be used as such cellulose ester.

The average degree of substitution of the cellulose ester is not particularly restricted as far as not affecting adversely on the moldability and other properties of the composition, and can be selected from a wide range according to the intended application. For instance, the average substitution degree of the cellulose ester is about 1 to 2.8 (e.g. about 1.5 to 2.5). Use of such low-substituted cellulose ester will improve or enhance the biodegradability as well as the photodegradability, and results in decomposition of the cellulose ester with high efficiency.

The low-substituted cellulose ester with high biodegradability has an average degree of substitution of, for example, not exceeding 2.15, preferably about 1.0 to 2.15, and more preferably about 1.1 to 2.0. When the degree of substitution is less than 1.0, the water resistance of the article tends to be sacrificed. While if it exceeds 2.15, not only the compatibility with other components and melt flow characteristics (fluidity) but also biodegradability is considerably sacrificed.

The degree of substitution (DS) of the cellulose ester is defined as follows. Taking cellulose acetate as an example, DS can be calculated by means of the following equation:

$$DS=(162 \times Y)/(60-42 \times Y)$$

where Y=X/100 and X represents the percentage of bound acetic acid (degree of acetylation).

The average degree of polymerization of the cellulose ester may range from about 50 to 250, for instance, and is preferably about 100 to 200. When the average degree of polymerization is less than 50, the mechanical properties of the shaped article are deteriorated and when it exceeds 250, not only the fluidity and moldability of the composition but also the biodegradability of the article is adversely affected.

The average degree of polymerization (DP) of the cellulose ester may be determined by the use of an Ostwald's viscometer. By way of illustration, dropping times from the viscometer are determined for a solution of cellulose ester in a solvent and the solvent at 25° C., respectively, and the average degree of polymerization may be calculated by the following formulae.

$\eta_{rel} = t/t_o$ $\ln \eta_{rel} = 2.3026 \times \log \eta_{rel}$ $[\eta] = (\ln \eta_{rel})/C$ $DP = [\eta]/9 \times 10^{-4}$ where t represents a dropping time (second) of the solution of cellulose ester, $t_o$ represents a dropping time (second) of the solvent, and C shows a concentration (g/liter) of the cellulose ester in the solution.

In the above method, acetone is usually employed as a solvent and the concentration of the cellulose ester in a solution is generally about 0.2% (w/v).

The low-substituted cellulose ester with high biodegradability includes, among others, cellulose esters giving 4-week decomposition rate of at least 60% by weight and preferably not less than 65% by weight (e.g. 65 to 100%), in 4 weeks when determined using the amount of evolved carbon dioxide as an indicator in accordance with ASTM (American Society for Testing and Materials) D5209-91. In the determination of biodegradability, an active sludge of a municipal sewage treatment plant may be used as an active sludge. The decomposition rate of a cellulose ester can be found by converting the amount of evolved carbon dioxide to the number of carbon atoms and calculating its percentage relative to the total number of carbon atoms available prior to the decomposition.

The equivalent ratio of residual alkali metal or alkaline earth metal to residual sulfuric acid in the cellulose ester, particularly in the low-substituted cellulose ester, has an important bearing on the biodegradability of such cellulose ester. The highly biodegradable cellulose ester includes cellulose esters in which the equivalent ratio of alkali metal or alkaline earth metal relative to residual sulfuric acid is about 0.1 to 1.1 and preferably about 0.5 to 1.1. Use of the cellulose ester with an equivalent ratio of alkali metal and/or alkaline earth metal relative to residual sulfuric acid of less than 0.1 sacrifices the heat resistance and when the equivalent ratio exceeds 1.1, the biodegradability of the cellulose ester is adversely affected.

The sulfuric acid is derived from the sulfuric acid used as a catalyst in the production of the cellulose ester. The sulfuric acid includes not only a free acid but also sulfate salt, sulfoacetate and sulfate ester that may remain in the cellulose ester. The total amount of the residual sulfuric acid in the cellulose ester, in terms of $SO_4^{2-}$, is generally about $1.8 \times 10^{-3}$ to $6.0 \times 10^{-2}$ weight % (corresponding to 0.005 to 0.1 mol %).

The alkali metal and/or alkaline earth metal is added as a neutralizer for the catalyst sulfuric acid as well as for the purpose of enhancing the thermal resistance of cellulose esters such as cellulose acetate. As to the mode of addition, such metal may be added to the reaction mixture after completion of the reaction or to the isolated product cellulose acetate or other cellulose esters.

As typical examples of the alkali metal, there may be mentioned lithium, potassium, sodium, etc. and the alkaline earth metal includes, for instance, magnesium, calcium, strontium, barium and so on.

The cellulose ester composition of the present invention may comprise, for further improving the biodegradability, a cellulose ester having an average degree of substitution of not more than 2.15, an average degree of polymerization of 50 to 250 and an equivalent ratio of residual alkali metal or alkaline earth metal relative to residual sulfuric acid in the cellulose ester of 0.1 to 1.1.

The cellulose ester composition of the present invention may be a composition composed independently of a cellulose ester having a single average degree of substitution, or a composition comprising a plurality of cellulose esters being different in the degree of substation from each other.

In order to improve the biodegradability of the composition comprising a plurality of cellulose esters varying in the degree of substitution, it may practically contain the low-substituted cellulose ester and one or more other cellulose esters (unless otherwise indicated, referred to briefly as the high-substituted cellulose ester). The degree of substitution of the high-substituted cellulose ester need only be different from that of the low-substituted cellulose ester and the substituent group thereof may be the same as or different from the substituent group of the low-substituted cellulose ester. Example of the high-substituted cellulose ester includes poorly biodegradable high-substituted cellulose esters (e.g. cellulose esters with degrees of substitution not less than 2.2 and more preferably not less than 2.4). The preferred high-substituted cellulose ester is generally one having a substituent identical or similar, preferably identical, to the substituent of the low-substituted cellulose ester. When the low-substituted cellulose ester is cellulose acetate, the identical or similar substituent mentioned above includes organic acid ester residue with about 1 to 4 carbon atoms.

The composition containing a plurality of cellulose esters varying in the degree of substitution is characterized in that the photodegradability and biodegradability of the whole cellulose ester can be enhanced even when the proportion of the low-substituted cellulose ester is small. The low-substituted cellulose ester content of the composition is, for instance, not less than 10% by weight, preferably about 10 to 90% by weight and more preferably about 10 to 75% by weight (e.g. 10 to 50% by weight) based on the total cellulose ester. When the proportion of the low-substituted cellulose ester is not less than 10% by weight, the degradability of the poorly photodegradable and biodegradable high-substituted cellulose ester is remarkably improved. The cellulose ester composition containing not less than 10% by weight of the low-substituted cellulose ester as a cellulose ester component is decomposed, in 4 weeks, by not less than 20% by weight, preferably by not less than 25% by weight, as determined using the amount of evolution of carbon dioxide as an indicator in accordance with ASTM D5209-91. As the proportion of the low-substituted cellulose ester is increased, the resultant cellulose ester composition is photodegraded or biodegraded in a shorter time.

The mechanism of the photolysis of such composition is supposed to be due to oxidation of the cellulose ester caused by the titanium oxide which is activated by the light irradiation. The mechanics of biodegradation which is involved in such a composition remains to be not fully elucidated but it is supposed that microorganisms which, by nature, do not decompose high-substituted cellulose esters are adapted in the presence of even a miner proportion of the low-substituted cellulose ester so that they are rendered capable of decomposing the high-substituted cellulose ester as well.

The cellulose ester can be produced, irrespective of the degree of substitution, by a variety of conventional processes. Moreover, the degree of substitution of a cellulose ester can be adjusted in one step reaction between cellulose and an organic acid or acid anhydride or, alternatively, by preparing a highly substituted cellulose ester (e.g. trisubstituted product) and adjusting its degree of substitution by subsequent partical hydrolysis.

A feature of the present invention resides in enhancement of the photodegradability of a cellulose ester by the use of a specific anatase-type titanium oxide. The crystal structure of titanium dioxides can be classified roughly into a rutile type and an anatase-type. The anatase-type titanium oxide has much higher activity by means of ultraviolet ray or other rays as compared with the rutile type titanium oxide. Therefore, the anatase-type titanium dioxide can preferably be employed for higher photodegradability.

The specific surface area and particle size of the titanium dioxide also significantly affect on the photooxidation. In other words, the smaller the particle size and the larger the specific surface area of the titanium dioxide, the higher is the activity per unit weight associated with irradiation of a ray such as an ultraviolet ray. Accordingly, use of a titanium oxide having a small particle size and large specific surface area insures, even in a small amount, an improved photodegradability of the cellulose ester.

(1) The specific surface area of the titanium dioxide is, for example, not less than 30 $m^2/g$ (e.g. about 30 to 200 $m^2/g$), preferably not less than 50 $m^2/g$ (e.g. about 50 to 200 $m^2/g$) and more preferably about 60 to 150 $m^2/g$ (e.g. about 60 to 100 $m^2/g$) as determined in accordance with the BET method. The specific surface area of the titanium dioxide is practically about 50 to 150 $m^2/g$.

(2) The mean particle size of the primary particle of the titanium dioxide is for instance about 0.001 to 0.07 $\mu$m (e.g. about 0.002 to 0.05 $\mu$m), preferably about 0.003 to 0.05 $\mu$m, more preferably about 0.01 to 0.05 $\mu$m, and practically about 0.005 to 0.05 $\mu$m.

The titanium dioxide may only have either of the characteristics (1) the specific surface area and (2) the mean particle size, but preferred titanium dioxide includes a titanium oxide having the both characteristics of (1) the specific surface area and (2) the mean particle size. Such titanium dioxide may practically has (3) a specific surface area of not less than 30 $m^2/g$ and a primary particle size of about 0.001 to 0.07 $\mu$m (e.g. about 0.002 to 0.05 $\mu$m), preferably a specific surface area of not less than 50 $m^2/g$ and a primary particle size of 0.003 to 0.05 $\mu$m, and for still better results, a specific surface area of about 60 to 150 $m^2/g$ and a primary particle size of about 0.01 to 0.05 $\mu$m.

The titanium oxide may preferably be subjected to surface treatment with an organic substance and/or inorganic substance for enhancing photodegradability and dispersibility. Preferred component of such a treating agent includes at least one component selected from the group consisting of phosphorus compounds, polyhydric alcohols and amino acids. Among others, preferred is the titanium dioxide subjected to surface treatment with a phosphorus compound, and at least one component selected from polyhydric alcohols and amino acids.

Such titanium oxide treated with the surface treating agent insures high dispersibility, large surface area per unit weight which is utilizable, and hence improved photodegradability. Therefore, the titanium oxide subjected to surface-treatment with the above component insures efficient utilization of the activity of the titanium oxide and hence need not have the above-specified specific surface area and/or mean particle size of the primary particle, contrary to the above-mentioned titanium oxide. By way of illustration, the titanium oxide to be treated may have a BET specific surface area of less than 30 $m^2/g$, and the mean particle size of the primary particle thereof may be less than 0.001 $\mu$m or exceeding 0.07 $\mu$m (e.g. 0.08 to 1.5 $\mu$m). However, surface treatment of a titanium oxide with a small particle size and/or a titanium oxide with a large specific surface area provides further enhanced photodegradability. Preferred titanium dioxide treated with the surface treating agent includes titanium dioxides having the above specific surface area and/or mean particle size of the primary particle.

As examples of the phosphorus compound, there may be mentioned phosphorus oxides such as phosphorus trioxide and phosphorus pentaoxide; phosphoric acids or salts thereof such as hypophosphorous acid, phosphorous acid, hypophosphoric acid, orthophosphoric acid, pyrophosphoric acid, triphosphoric acid, metaphosphoric acid and polyphosphoric acid or salts of these phosphoric acids and others; phosphonium salts; phosphines including alkylphosphines such as methylphosphine, ethylphosphine, butylphosphine, dimethylphosphine, diethylphosphine, dibutylphosphine, dioctylphosphine, trimethylphosphine, triethylphosphine, tributylphosphine, trioctylphosphine and so on, arylphosphines such as phenylphosphine, diphenylphosphine, triphenylphosphine and the like; phosphoric acid esters and so forth. Preferred example of the phosphorus compound includes hydrophilic or water-soluble phosphorus compounds inclusive of phosphorus oxides such as phosphorus pentaoxide, phosphoric acids and salts thereof. The salts of phosphoric acids include salts with alkali metals such as sodium, potassium and the like, and ammonium salts, typically speaking. These phosphorus compounds may be used singly or in combination.

The polyhydric alcohol includes, for instance, alkylene glycols such as ethylene glycol, propylene glycol, 1,3-butanediol and tetramethylene glycol; polyoxyalkylene glycols such as diethylene glycol, triethylene glycol, polyethylene glycol, dipropylene glycol, tripropylene glycol and polypropylene glycol; polyhydric alcohols including saccharides, such as glycerin, trimethylolpropane, trimethylolethane, pentaerythritol, sorbitol and so on; fatty acid esters of glycols such as ethylene glycol monomethyl ester, ethylene glycol monobutyl ester, diethylene glycol monomethyl ester, diethylene glycol monoethyl ester, diethylene glycol monobutyl ester, propylene glycol monomethyl ester, propylene glycol monobutyl ester and the like. Preferred example of the polyhydric alcohol includes propylene glycol and other hydrophilic or water-soluble glycols. Such polyhydric alcohols can be employed independently or in combination.

Examples of the amino acid include amino acids each having an alkyl group such as glycine, alanine, valine, isoleucine and leucine; amino acids each having a hydroxyl group such as serine, threonine and tyrosine; amino acids which form cyclic rings together with the adjacent nitrogen atom such as proline; amino acids each having two carboxylic groups such as aspartic acid and glutamic acid; amino acids each having two amino groups such as lysine and arginine; amino acids each having an amide group such as asparagine and glutamine; amino acids each having a mercapto group or an alkylthio group such as cysteine and methionine; amino acids each having an aromatic ring or heterocycle such as tryptophan, phenylalanine, histidine and others. These amino acids may be whichever of D-, L- or DL-form and may also be used as a salt with an alkali metal such as sodium, potassium and others or an ammonium salt. Preferred amino acid includes, for example, amino acids each having a hydrophilic group such as a hydroxyl group, a mercapto group, a carboxyl group and an amino group other than the amino group and carboxyl group constituting the amino acid. These amino acids and salts thereof may be used singly or in combination.

Among the above surface treating agents, practical use may be made of those species of compounds having high safety to a human body, such as compounds permitted as food additives. Such compound having high safety includes, for instance, phosphoric acids and salts thereof such as sodium metaphosphate, sodium pyrophosphate, potassium pyrophosphate, sodium polyphosphate and potassium polyphosphate; glycols such as propylene glycol; amino acids such as glycine, threonine and so forth.

The components of the surface treating agent may be used singly or in combination. Preferred example of the surface treating agent includes a combination of a phosphorus compound such as a phosphoric acid or its salt, and at least one component selected from polyhydric alcohols and amino acids or salts thereof. Typically, a titanium oxide treated with the phosphorus compound and then with at least one component selected from the polyhydric alcohols, amino acids and salts thereof is preferred. In particular a titanium oxide subjected to a treatment to impart hydrophilic properties can advantageously be employed.

In the surface treatment of the titanium oxide, a surfactant (e.g. an anionic surfactant, an nonionic surfactant, etc.) and/or a metallic soap may also be used.

The surface treatment of the titanium oxide can be conducted in a conventional manner such as dipping of the titanium oxide in a solution containing the above component, spraying such solution to the titanium oxide and other techniques. The total amount of the component (s) in the surface treatment can be selected from a range not adversely affecting the dispersibility, photoactivity or other properties of the titanium oxide, and is for example about 0.01 to 20 parts by weight, preferably about 0.05 to 10 parts by weight, more preferably about 0.1 to 5 parts by weight and practically about 0.5 to 3 parts by weight relative to 100 parts by weight of the titanium oxide. The phosphorus compound may practically be used in the treatment in a proportion of about 0.1 to 10 parts by weight and preferably about 0.5 to 5 parts by weight relative to 100 parts by weight of the titanium oxide.

The titanium oxide may support or carry a metallic catalyst thereon for enhancing the light irradiation-associated activity and the decomposition efficiency of the cellulose ester. Examples of such transition metal include zirconium (Zr) and other Group 3A metals of Periodic Table of the Elements, vanadium (V) and other Group 4A metals of Periodic Table of the Elements, chromium (Cr), molybdenum (Mo) and other Group 5A metals of Periodic Table of the Elements, manganese (Mn) and other Group 6A metals of Periodic Table of the Elements, iron (Fe), ruthenium (Ru) and other Group 8 metals of Periodic Table of the Elements, cobalt (Co), rhodium (Rh) and other Group 9 metals of Periodic Table of the Elements, nickel (Ni), palladium (Pd), platinum (Pt) and other Group 10 metals of Periodic Table of the Elements, copper (Cu), silver (Ag), gold (Au) and other Group 1B metals of Periodic Table of the Elements. Among these metals, noble metals of Group 10 and Group 1B of Periodic Table of the Elements such as Pd, Pt, Au and others are preferable. These metals may also be supported on the titanium oxide in the form of chlorides or other halides, oxides or complexes of the metals.

The supporting amount of the metal or its compound relative to 100 parts by weight of the titanium oxide is, for example, about 0.001 to 10 parts by weight and preferably about 0.01 to 5 parts by weight in terms of the metal.

The proportion of the titanium oxide in the cellulose ester composition can suitably selected from a range where the photodegradability and moldability of the composition are not sacrificed, and is, for instance, about 0.01 to 20 parts by weight, preferably about 0.1 to 10 parts by weight and more preferably about 0.25 to 5 parts by weight relative to 100 parts by weight of the cellulose ester. The composition containing the titanium oxide in a proportion of about 0.5 to 3 parts by weight relative to 100 parts by weight of the cellulose ester can practically be used. When the content of the titanium oxide is less than 0.01 part by weight, the photodegradability will not satisfactorily be improved, and when it exceeds 20 parts by weight, the moldability tends to be sacrificed, and in some species of product articles, the masking properties of the titanium oxide will be increased so that the transmittance of an ultraviolet ray may occasionally be detracted.

The titanium dioxide may be dispersed in the cellulose ester according to a conventional technique. As such technique, there may be mentioned, for example, a technique which comprises melting a mixture of the cellulose ester and the titanium oxide and mixing the molten mixture to form a dispersion, a technique which comprises dispersing the titanium oxide into a solution of the cellulose ester in an organic solvent (e.g. an acetone solution), or other techniques. In dispersion of the titanium oxide, use can be made of various mixing-dispersing machines such as an extruder, a kneader and other melting-mixing machines, a ball mill, a sand mill, an ultrasonic dispersing machine and other dispersing machine. When the titanium oxide is dispersed in such cellulose ester solution in an organic solvent, addition of an aqueous dispersing element of the titanium oxide having a small particle size to the cellulose ester solution in an organic solvent detracts from a homogeneous dispersion of the titanium oxide. However, the use of the above titanium oxide subjected to a surface treatment insures easy or readily dispersion of the titanium oxide and hence high stability of the dispersion.

The cellulose ester composition of the present invention may only contain the specific anatase-type titanium oxide, and may further contain other anatase-type titanium oxide than the above-specified (e.g. a non-treated titanium oxide having a specific surface area of less than 30 m$^2$/g, a primary particle diameter of less than 0.001 $\mu$m, or more than 0.07 $\mu$m), a rutile type titanium oxide or others.

The composition according to the present invention may only comprise the cellulose ester and the titanium oxide, but it may further contain at least one ingredient selected from the group consisting of plasticizers, aliphatic polyesters and biodegradation accelerators for further improving or enhancing the moldability and biodegradability.

The composition of the present invention comprising the above ingredients may be classified into the following embodiments:

(1) A composition comprising the cellulose ester, the titanium oxide and a plasticizer, (2) A composition comprising the cellulose ester, the titanium oxide and an aliphatic polyester, (3) A composition comprising the cellulose ester, the titanium oxide, a plasticizer and an aliphatic polyester, (4) A composition comprising the cellulose ester, the titanium oxide and a biodegradation accelerator, and (5) A composition comprising the cellulose ester, the titanium oxide, a plasticizer and/or an aliphatic polyester, and a biodegradation accelerator.

The cellulose ester composition may practically be used in the embodiments (1), (2), (3) and (5) for further enhancing the moldability of the composition, and it may generally be employed in the embodiments (2), (3), (4) and (5) for further elevating the mold-ability and biodegradability.

As the plasticizer, various plasticizers for plasticizing cellulose esters can be utilized. Examples of such plasticizer include aromatic polycarboxylic acid esters such as dimethyl phthalate, diethyl phthalate, dibutyl phthalate, dihexyl phthalate, dioctyl phthalate, dimethoxyethyl phthalate, ethylphthalyl ethylglycolate and other phthalic acid esters, butylphthalyl bytylglycolate, tetraoctyl pyromellitate and tetraoctyl trimellitate; aliphatic polycarboxylic acid esters such as dibutyl adipate, dioctyl adipate, dibutyl sebacate, dioctyl sebacate, diethyl azelate, dibutyl azelate, dioctyl azelate and so on; lower fatty acid esters of polyhydric alcohols such as glycerin, trimethylolpropane, pentaerythritol, sorbitol and the like (e.g. glycerin triacetate (triacetin), diglycerin tetraacetate, etc.); phosphoric acid esters such as triethyl phosphate, tributyl phosphate, tributoxyethyl phosphate, triphenyl phosphate, tricresyl phosphate and so forth. These plasticizers can be employed singly or in combination.

The aliphatic polyester includes, for instance, polyesters of dibasic acids with glycols, polycaprolactone or other polyesters.

As examples of the dibasic acid, there may be mentioned dicarboxylic acids each having about 2 to 14 carbon atoms such as oxalic acid, succinic acid, adipic acid, sebacic acid, azelaic acid and other saturated aliphatic dicarboxylic acids, fumaric acid, itaconic acid and other unsaturated aliphatic dicarboxylic acids. Examples of the glycol include glycols each having about 2 to 12 carbon atoms such as ethylene glycol, diethylene glycol, triethylene glycol, 1,2-propanediol, dipropylene glycol, 1,3-butanediol, 1,4-butanediol, 2,2-dimethyl-1,3-propanediol, 1,6-hexanediol, neopentyl glycol, 3-methyl-1,5-pentanediol and the like. Such dibasic acids and glycols may, respectively, be used singly or in combination.

The aliphatic or chain (linear) polyester can be obtained by allowing a dibasic acid with a glycol. A monohydric alcohol such as butanol, hexanol, 2-ethylhexanol and n-octanol may be used in such reaction as a molecular weight control agent. Further, glycerin, trimethylolpropane, other polyhydric alcohol or other polycarboxylic acid may also be partially incorporated in the composition, if necessary.

As the polycaprolactone, there may be mentioned for example polycaprolactones (e.g. polycaprolactones with molecular weights of about $1 \times 10^4$ through $10 \times 10^4$), caprolactonediols (e.g. caprolactonediols with molecular weights of about 530 to 4,000), caprolactonetriols (e.g. caprolactonetriols with molecular weights of about 300 to 2,000) and others.

For improved degradation associated with light irradiation or microbial function, the molecular weight of the aliphatic polyester may be, for example, about 200 through $20 \times 10^4$, preferably about 300 through $10 \times 10^4$ and more preferably about 300 through $1 \times 10^4$.

The above-mentioned plasticizer and aliphatic polyester can be used in combination but need not be used depending on the photodegradability and/or biodegradability of the cellulose ester.

By using a biodegradation accelerator, the cellulose ester is rendered the more photodegradable. Therefore, high degradability of the cellulose ester, even in a shaped article, can be obtained with high photodegradability caused by the titanium oxide.

As typical examples of the biodegradation accelerator, there may be mentioned organic acids such as oxo acids (e.g. oxo acids each having about 2 to 6 carbon atoms such as glycolic acid, lactic acid, citric acid, tartaric acid, malic acid, etc.) and saturated dicarboxylic acids (e.g. lower saturated dicarboxylic acids each having about 2 to 6 carbon atoms such as oxalic acid, malonic acid, succinic acid, succinic anhydride, glutaric acid, etc.); and lower alkyl esters of such organic acids with alcohols each having about 1 to 4 carbon atoms. The preferred biodegradation accelerator includes, for example, organic acids with about 2 to 6 carbon atoms, such as citric acid, tartaric acid, malic acid and so on. These biodegradation accelerators can also be employed independently or in combination.

The biodegradation accelerator further includes biodegrading enzymes such as various hydrolases, e.g. lipase, cellulose, esterase and so on. The biodegrading enzymes can be immobilized on or in a water-soluble polymer or other support, or microencapsulated with a water-soluble polymeric shell material and, as such, be incorporated in, or deposited on, the cellulose ester composition or an article made therefrom.

Meanwhile, where a highly biodegradable cellulose ester is employed, the use of such biodegradation accelerator may not be essential.

The above-mentioned ingredient materials can be used in optional combinations and proportions. The proportion of a plasticizer and/or an aliphatic polyester in the composition is, for example, about 0 to 100 parts by weight, preferably about 5 to 100 parts by weight and more preferably about 25 to 75 parts by weight relative to 100 parts by weight of the cellulose ester, and the amount of a biodegradation accelerator in the composition is, for instance, about 0 to 5 parts by weight, preferably about 0.005 to 5 parts by weight and more preferably about 0.007 to 3 parts by weight relative to 100 parts by weight of the cellulose ester. If the proportion of the plasticizer and/or aliphatic polyester exceeds 100 parts by weight, the thermal resistance or other properties tends to be sacrificed, while the use of the biodegradation accelerator in excess of 5 parts by weight tends to detract from moldability such as spinnability.

The composition of the present invention may comprise, where necessary, other photolysis (photodegradation) accelerator in addition to the titanium oxide. As examples of such photolysis accelerator, there may be mentioned benzoins; benzoin alkyl ethers; benzophenone and its derivatives such as benzophenone, 4,4'-bis(dimethylamino)benzophenone, etc.; acetophenone and its derivatives such as acetophenone, α,α-diethoxyacetophenone, etc.; quinones; thioxanthones; phthalocyanine and other photoexciting agents, ethylene-carbon monoxide copolymers, aromatic ketone-metal salt sensitizers, N,N-dialkyldithiocarbamates and so on. These photolysis accelerators may be used singly or in combination.

The composition of the present invention may contain, as necessary, a variety of additives such as aging inhibitors, e.g. antioxidants, fillers, antistatic agents, coloring agents and the like.

The above composition is useful for the manufacture of various shaped articles. Such shaped articles (molded articles) can be manufactured by conventional molding processes such as extrusion, blow molding, foam molding, injection molding, casting, spinning and others. The shaped articles may be cut or otherwise processed.

The shaped articles include, for instance, a variety of cellulose ester-based articles such as films optionally creped, sheets, containing vessels, seeding pots, nets, bags, fibers, fibrous articles and so forth. The preferred articles include the film, fiber and fibrous article providing large areas of contact with the environment for increased degradation. There is no particular limitation on the shape of the fibrous article. The fibrous article includes, as typical examples, woven fabrics, nonwoven fabrics, papers and sheets manufactured by web-forming processes, cords, knitted open-mesh articles, hollow fibers, tows (fiber bundles) and cigarette filters (filter tips). As preferred examples of the fibrous article, there may be mentioned nonwoven fabrics, papers, sheets, tows and cigarette filters (filter tips) comprising the fiber, blended fiber or yarn, or bundles of such fiber.

The fiber and fibrous article may respectively be composed of blended fibers available from a plurality of cellulose esters varying in the average degree of substitution, inclusive of the low-substituted cellulose ester and high-substituted cellulose ester, as well as a cellulose ester fiber of a single average degree of substitution. For improved photodegradability and biodegradability, the proportion of the low-substituted cellulose ester fiber in the blended fiber may for example be not less than 10% by weight, preferably about 10 to 90% by weight and more preferably about 10 to 50% by weight based on the total weight of the cellulose ester fiber. When the proportion of the low-substituted cellulose ester fiber is 10% by weight or more, the degradability of the poorly degradable cellulose ester fiber can remarkably be increased. Moreover, the larger the proportion of the low-substituted cellulose ester fiber, the shorter is the degradation time of the fibrous article in the environment.

As assayed in accordance with ASTM D5209-91, the above fibrous article containing the low-substituted cellulose ester fiber is decomposed by not less than 20% by weight and preferably not less than 25% by weight in 4 weeks.

The above cellulose ester fiber can be obtained by a conventional spinning technology. By way of illustration, the cellulose ester and titanium dioxide, optionally together with the additive ingredients, are admixed and dispersed in an organic solvent and the resulting composition is wet- or dry-spun. Alternatively, the titanium oxide, and when necessary together with additive ingredients such as a plasticizer, is added to the cellulose ester, and the composition is melt-spun. It is also possible to extrude the low-substituted cellulose ester and high-substituted cellulose ester respectively and blend the two types of fibers, or where the low-substituted cellulose ester and high-substituted cellulose ester can be dissolved in a common solvent or melt-spun under common conditions, mix-extrude the low-substituted and high-substituted cellulose esters.

The fiber may be circular or elliptical, for instance, in cross-section, and for an increased specific surface area, may be a modified cross-section fiber. The fineness of the monofilament is not so critical but is generally about 0.1 to 100 $\mu$m and preferably about 1 to 50 $\mu$m.

Further, referring to the fibrous article, one or more biodegrading enzymes may be incorporated in, or deposited on, the cellulose ester fiber, in particular at least the low-substituted cellulose ester fiber. The same is true with the high-substituted cellulose ester fiber.

Such biodegrading enzymes include the hydrolases mentioned hereinbefore, such as lipase, cellulose and esterase. The biodegrading enzyme can be incorporated into the cellulose ester fiber, for example by immobilizing it on or in a water-soluble polymer or microencapsulating it with a water-soluble polymer and adding the resultant composition containing biodegrading enzyme to the spinning dope. The biodegrading enzyme may also be deposited on the spun fiber, fiber aggregate, fiber bundle or fibrous article by spray-coating, dipping or other method. When the fibrous article carrying the biodegrading enzyme so deposited or incorporated is contacted with water or others, the biodegrading enzyme is activated on dissolution of the water-soluble polymer or destruction of the microcapsules to thereby promote the degradation of the cellulose ester.

The still preferred fibrous article includes, for example, fibrous article composed of fibers or blended fibers integrated with a water-soluble adhesive, such as nonwoven fabrics, paper and other webs, sheets, etc., and fiber bundles or aggregates such as tobacco filters, in particular. Use of a water-soluble adhesive provides disintegration of the article into the constituent filaments on contact with water so that the biodegradability of the article is further enhanced.

As the water-soluble adhesive, there may be exemplified with natural adhesives such as starch, a modified starch, a soluble starch, dextran, gum arabic, sodium alginate, protein (e.g. casein, gelatin, etc.) and the like; cellulose derivatives such as methylcellulose, hydroxyethylcellulose, carboxymethylcellulose, etc.; and synthetic resin adhesives such as polyvinyl alcohol, polyvinylpyrrolidone, a water-soluble acrylic resin and others. These adhesives may be employed singly or in combination.

The cigarette filter (tobacco filter) generally comprises a takeup paper for taking up or work up a fiber bundle in a cylindrical form, a takeup glue (adhesive), rail glue (size), lap glue, mouth-tip paper and tip glue for bonding the paper. The glues (adhesives) mentioned above are also preferably the water-soluble adhesive. Thus, the preferred tobacco filter comprises a cylindrical takeup paper accommodating the fiber bundle, a cylindrical tip paper disposed at one end of the cylindrical takeup paper and a water-soluble adhesive for adhering the gluing margins of the takeup paper and tip paper to form a cylindrical assembly. Further, the takeup paper and tip paper are preferably made of paper which is disintegrated into constituent fibers on contact with water.

Since the composition and shaped (molded) article of the present invention comprise the cellulose ester and the titanium oxide, they are highly photodegradable, and the biodegradability can also be improved by the use of the low-substituted cellulose ester. Furthermore, the composition and shaped article containing the biodegradation accelerator show further enhanced biodegradability and the composition and article supplemented with the plasticizer and/or aliphatic polyester are excellent in moldability and biodegradability. Therefore, even if the article is discarded outdoors, it is rapidly decomposed, thus reducing the risk of pollution.

The intentional degradation of the article can be conducted under outdoor exposure conditions where light acts thereon, for example at a temperature from about 0° to 50° C. and preferably around room temperature (e.g. from about 10° to 40° C.), and about 30 to 90% relative humidity. The light for decomposition of the article may practically be a light comprising an ultraviolet ray, such as solar ray (sunshine), a xenon light or others. Among them, active rays such as an ultraviolet ray can advantageously be used. Moreover, to accelerate the degradation or decomposition of the shaped article, it is instrumental to expose the article to soil or water containing microorganisms adapted or acclimatized to the cellulose and organic acid or other constituents of the cellulose ester. Using an active sludge containing such microorganisms, an enhanced degradability in the environment can be expected.

Since the cellulose ester composition and shaped article of the present invention, such as fibrous article, contain specific titanium dioxide, they are highly photodegradable and excellent in degradability in the environment where a light acts thereon. When they contain the low-substituted cellulose ester, the biodegradability thereof by the function of microorganisms can be enhanced in addition to the photodegradability. Accordingly, when the article is discarded outdoors or other conditions, it disintegrate itself rapidly, thus mitigating the pollution burden on the environment. Further, even when the particle size of the titanium oxide is small, the composition insures high dispersion stability and spinnability so that efficient manufacture of fibers and fibrous articles with enhanced photodegradability can be realized. Furthermore, the composition according to the present invention enables the use of a conventional plasticizer and yet provides excellent moldability and photodegradability.

The following examples are intended to describe the present invention in more detail and should by no means be construed as defining the scope of the invention.

EXAMPLES

In the examples and comparative examples, the reducing rate of ethanol (ethanol loss) associated with light irradiation was estimated. Thus, a reaction system comprising 15 mg of a titanium oxide, 100 ppm of ethanol and 40 ml of water was irradiated with xenon light (1 kW) at a distance of 25 cm for 30 minutes and the UV-associated decrease in the amount of ethanol was determined by measuring the residual ethanol in the reaction system.

The total sulfuric acid in the cellulose acetate was determined by combusting the cellulose acetate powder in an electric furnace at 1,300° C., trapping the evolved sulfurous acid gas in 10% hydrogen peroxide-water and titrating it with an aqueous solution of sodium hydroxide. The data are values in terms of $so_4^{2-}$.

Example 1

Using 100 parts by weight of cellulose, 15 parts by weight of sulfuric acid, 280 parts by weight of acetic anhydride and 380 parts by weight of a solvent, the esterification reaction was carried out at 35° C. for 3 hours and the reaction mixture was then neutralized with calcium acetate. This cellulose acetate (100 parts by weight) was hydrolyzed for 5 hours to provide a cellulose acetate having a degree of substitution of 2.14, a residual sulfuric acid content of $1.17 \times 10^{-2}$ weight % (0.031 mole %), a residual calcium-to-residual sulfuric acid mol ratio of 1.0 and a degree of polymerization of 185.

To 100 parts by weight of the cellulose acetate with a substitution degree of 2.14 was added 1.5 parts by weight of an anatase-type titanium oxide (mean particle size of 0.03 μm, specific surface area of 75 m²/g, surface-treated with 2% by weight of phosphorus pentaoxide and 0.5% by weight of DL-threonine, ethanol loss of 61%). The resultant mixture was dispersed in 235 parts by weight of a mixed solvent of acetone and water (96.5/3.5, weight %) to prepare a spinning dope. Using this dope, dry spinning was carried out to give 5-denier filaments.

The above-prepared dope was filtrated using a low-pressured filtrating testing machine at a filtrating pressure of 1.5 kg/cm² (filter material: Filter paper No. 63 (1 piece) manufactured by Toyo Roshi Incorporation, available from Advantec Toyo Incorporation). The loss ratio of the titanium oxide associated with the filtration was then determined, and resultantly, the titanium oxide was lost in a proportion of 2.72% by weight and the dope showed excellent dispersibility.

Example 2

Hundred (100) parts by weight of the cellulose acetate with a substitution degree of 2.14 obtained in Example 1 was blended with 1.0 part by weight of an anatase-type titanium oxide (mean particle size of 0.03 μm, specific surface area of 75 m²/g, surface-treated with 2% by weight of phosphorus pentaoxide and 0.5% by weight of DL-threonine, ethanol loss of 61%) and 0.1 part by weight of an anatase-type titanium oxide (mean particle size of 0.3 μm, specific surface area of 9 m²/g), and the mixture was dispersed in 235 parts by weight of a mixed solvent of acetone and water (96.5/3.5, percent by weight) to prepare a spinning dope. With the use of this dope, dry-spinning was conducted to give 5-denier filaments.

Example 3

To 100 parts by weight of the cellulose acetate with a substitution degree of 2.14 obtained in Example 1 were added 0.5 part by weight of an anatase-type titanium oxide (mean particle size of 0.03 μm, specific surface area of 75 m²/g, surface-treated with 2% by weight of phosphorus pentaoxide and 0.5% by weight of DL-threonine, ethanol loss of 61%) and 0.2 part by weight of an anatase-type titanium oxide (mean particle size of 0.3 μm, specific surface area of 9 m²/g, untreated, ethanol loss of 28%). The resultant mixture was dispersed in 235 parts by weight of a mixed solvent of acetone and water (96.5/3.5, weight %) to prepare a spinning dope. Using this dope, dry-spinning was carried out to give 5-denier filaments.

Comparative Example 1

Filaments of 5 deniers were obtained in the similar manner to Example 1 without using the anatase-type titanium oxide.

Comparative Example 2

To 100 parts by weight of the cellulose acetate with a substitution degree of 2.14 obtained in Example 1 was added 0.5 part by weight of an anatase-type titanium oxide (mean particle size of 0.3 μm, specific surface area of 9 m²/g, untreated, ethanol loss of 28%), and the resultant mixture was dispersed in 235 parts by weight of a mixed solvent of acetone and water (96.5/3.5, weight %) to provide a spinning dope. The filtration-associated loss rate of the titanium oxide was determined in the same manner as Example 1. As a result, the loss rate of the titanium oxide was 2.68% by weight. With the use of this dope, 5-denier filaments were provided by dry-spinning.

The filaments according to Examples 1 to 3, Comparative Examples 1 and 2 were subjected to weather resistance testing using a fade-O-meter according to Japanese Industrial Standards (JIS) L-1-13 and the tensile strength and tensile elongation were determined. The photodegradability of the filaments was also evaluated by plotting the time course of retention of filament strength and elongation with the tensile strength and elongation values prior to irradiation being taken as 100. The results are set forth in Table 1. In the following Tables, the term "dis" means that the filaments were disintegrated.

TABLE 1

| | | irradiation time (hours) | | | | |
|---|---|---|---|---|---|---|
| | | 0 | 25 | 50 | 75 | 100 |
| Example 1 | tensile strength (g/d) | 1.170 | 0.313 | dis | dis | dis |
| | retention % | 100 | 27 | | | |
| | tensile elongation (g/d) | 30.74 | 3.95 | dis | dis | dis |
| | retention % | 100 | 13 | | | |
| Example 2 | tensile strength (g/d) | 1.230 | 0.515 | dis | dis | dis |
| | retention % | 100 | 42 | | | |
| | tensile elongation (g/d) | 19.63 | 4.94 | dis | dis | dis |
| | retention % | 100 | 25 | | | |
| Example 3 | tensile strength (g/d) | 1.206 | 0.526 | 0.441 | dis | dis |
| | retention % | 100 | 44 | 37 | | |
| | tensile elongation (g/d) | 24.07 | 7.65 | 5.16 | dis | dis |
| | retention % | 100 | 32 | 21 | | |
| Com. Ex. 1 | tensile strength (g/d) | 1.378 | 1.361 | 1.339 | 1.304 | 1.128 |
| | retention % | 100 | 99 | 97 | 95 | 88 |
| | tensile elongation (g/d) | 34.81 | 30.12 | 29.26 | 28.19 | 25.68 |
| | retention % | 100 | 87 | 84 | 81 | 74 |
| Com. Ex. 2 | tensile strength (g/d) | 1.257 | 0.766 | 0.723 | 0.645 | dis |
| | retention % | 100 | 61 | 58 | 51 | |
| | tensile elongation (g/d) | 31.73 | 13.95 | 9.63 | 7.65 | dis |
| | retention % | 100 | 44 | 30 | 24 | |

As apparent from Table 1, the filaments according to Examples 1 through 3 show significantly greater decrease in the strength and elongation by light irradiation, and hence are remarkably highly photodegradable in comparison with the filaments according to Comparative Examples 1 and 2, i.e. the filament without adding an anatase-type titanium oxide or the filament with an anatase-type titanium oxide having a larger particle size.

Examples 4 to 6, Comparative Examples 3 and 4

Using the dopes obtained in Examples 1 to 3 and Comparative Examples 1 and 2, films with a thickness of 25 μm were provided by casting method. These films were irradiated with the use of a sunshine-weather-O-meter (Atlas CXW weather-O-meter). The tensile strengths of the films after 48 hours, 96 hours and 144 hours from the initial of the irradiation were respectively determined using Shimaztu autograph AG-1000B (manufactured by Shimazu Seisakusho Co., Ltd.,) and the retention percent of the tensile strength was calculated. The results are shown in Table 2.

Example 7

To 100 parts by weight of the cellulose acetate with a substitution degree of 2.14 obtained in Example 1 was added 0.5 part by weight of an anatase-type titanium oxide (mean particle size of 0.03 μm, specific surface area of 75 m²/g, surface-treated with 2% by weight of phosphorus pentaoxide and 0.5% by weight of DL-threonine, ethanol loss of 61%), and the mixture was homogeneously dispersed in 235 parts by weight of a mixed solvent of acetone and water (96.5/3.5, weight %) to provide a spinning dope. With the use of this dope, a film with a thickness of 25 μm was manufactured by casting method. The retention percent of this film was calculated in the same manner as Examples 4 to 6. The results are set forth in Table 2.

Example 8

Hundred (100) parts by weight of the cellulose acetate with a substitution degree of 2.14 obtained in Example 1 was mixed with 1.0 part by weight of an anatase-type titanium oxide (mean particle size of 0.016 μm, specific surface area of 92 m²/g, surface-treated with 2.3% by weight of phosphorus pentaoxide and 0.7% by weight of DL-threonine, ethanol loss of 66%). The resultant mixture was homogeneously dispersed in 235 parts by weight of a mixed solvent of acetone and water (96.5/3.5, weight %) to give a spinning dope. A film of 25 μm-thickness was prepared using this dope by casting. The retention percent of the tensile strength of this film was calculated in the same manner as Examples 4 to 6. The results are shown in Table 2. In Table 2, the symbol "N.M." means that the value was not measurable.

TABLE 2

| | Retention % of tensile strength | | | |
|---|---|---|---|---|
| Irradiation time | 0 | 48 hours | 96 hours | 144 hours |
| Example 4 | 100 | 28 | 6 | N.M. |
| Example 5 | 100 | 31 | 10 | N.M. |
| Example 6 | 100 | 36 | 15 | 5 |
| Example 7 | 100 | 40 | 17 | 8 |
| Example 8 | 100 | 32 | 12 | N.M. |
| Com. Ex. 3 | 100 | 100 | 100 | 95 |
| Com. Ex. 4 | 100 | 100 | 70 | 45 |

Example 9

To 100 parts by weight of the cellulose acetate with a substitution degree of 2.14 obtained in Example 1 were added 0.5 part by weight of an anatase-type titanium oxide (mean particle size of 0.03 μm. specific surface area of 75 m²/g, surface-treated with 2% by weight of phosphorus pentaoxide and 0.5% by weight of DL-threonine, ethanol loss of 61%) and 0.2 part by weight of a rutile type titanium oxide (manufactured by Kemira Co., Ltd., Unitane OR-450 (trade name), mean particle size of 0.2 μm, specific surface area of 6 m²/g, untreated). The resultant mixture was homogeneously dispersed in 235 parts by weight of a mixed solvent of acetone and water (96.5/3.5, weight %) to provide a spinning dope. By using this dope, dry-spinning was conducted to give 5-denier filaments.

Example 10

The cellulose acetate with a substitution degree of 2.14 obtained in Example 1 (100 parts by weight) was mixed with 0.2 part by weight of an anatase-type titanium oxide (mean particle size of 0.03 μm, specific surface area of 75 m$^2$/g, surface-treated with 2% by weight of phosphorus pentaoxide and 0.5% by weight of DL-threonine, ethanol loss of 61%) and 0.5 part by weight of a rutile type titanium oxide (Unitane OR-450 (trade name), manufactured by Kemira Co., Ltd., mean particle size of 0.2 μm, specific surface area of 6 m$^2$/g, untreated, ethanol loss of 3%). The mixture was homogeneously dispersed into 235 parts by weight of a mixed solvent of acetone and water (96.5/3.5, weight %) to give a spinning dope. Dry-spinning was carried out using this dope to provide 5-denier filaments.

Comparative Example 5

To 100 parts by weight of the cellulose acetate with a substitution degree of 2.14 obtained in Example 1 was added 0.5 part by weight of a rutile type titanium oxide (Unitane OR-450 (trade name), manufactured by Kemira Co., Ltd., mean particle size of 0.2 μm, specific surface area of 6 m$^2$/g, untreated, ethanol loss of 3%), and the resultant mixture was dispersed homogeneously into 235 parts by weight of a mixed solvent of acetone and water (96.5/3.5, weight %) to prepare a spinning dope. This dope was dry-spun to give 5-denier filaments.

Comparative Example 6

The procedure of Comparative Example 5 was repeated except for using 1.0 part by weight of the rutile type titanium oxide relative to 100 parts by weight of the cellulose acetate with a substitution degree of 2.14, to give 5-denier filaments.

The filaments obtained in Examples 9 and 10, and Comparative Examples 5 and 6 were respectively subjected to weather resistance testing using a fade-O-meter. The photodegradability of the filaments was also evaluated by plotting the time course of retention of filament strength and elongation. The results are set forth in Table 3.

Example 11

A spinning dope was prepared in the same manner as Example 1 except for employing an anatase-type titanium oxide (mean particle size of 0.03 μm, specific surface area of 66 m$^2$/g, surface-treated with 2% by weight of phosphorus pentaoxide and 0.5% by weight of propylene glycol, ethanol loss of 56%) in lieu of the titanium oxide used in Example 1. Using this dope, dry-spinning was conducted to give 5-denier filaments. The filtrating properties of the dope was evaluated, and as a result, it shows excellent dispersibility with the loss rate of the titanium oxide of 2.27%. The water-dispersibility of the titanium oxide was also estimated by filtrating the dope as intact without a load and measuring the residual amount of the titanium oxide remained on the filter. Resultantly, the dope showed high dispersibility with the residual ratio of the titanium oxide of 7.1% by weight.

What is claimed is:

1. A cellulose ester composition comprising a cellulose ester and an anatase titanium oxide, wherein said titanium oxide has:

a specific surface area of not less than 50 m$^2$/g.

2. A cellulose ester composition as claimed in claim 1, wherein the surface of said titanium oxide is treated with at least one component selected from the group consisting of a phosphorus compound or a salt thereof, a polyhydric alcohol and an amino acid or a salt thereof.

3. A cellulose ester composition as claimed in claim 1, wherein the surface of said titanium oxide is treated with a phosphorus compound or a salt thereof, and at least one component selected from a polyhydric alcohol and an amino acid or a salt thereof.

4. A cellulose ester composition as claimed in claim 1, wherein said titanium oxide is treated with at least one component selected from the group consisting of a phosphoric acid or a salt thereof, a glycol and an amino acid having a hydrophilic group in addition to the amino group and carboxyl group constituting said amino acid, or a salt thereof.

TABLE 3

| | | irradiation time (hours) | | | | |
|---|---|---|---|---|---|---|
| | | 0 | 25 | 50 | 75 | 100 |
| Example 9 | tensile strength (g/d) | 1.17 | 0.62 | 0.51 | 0.37 | dis |
| | retention % | 100 | 53 | 44 | 32 | dis |
| | tensile elongation (g/d) | 20.4 | 5.9 | 5.3 | 3.2 | dis |
| | retention % | 100 | 29 | 26 | 16 | dis |
| Example 10 | tensile strength (g/d) | 1.24 | 0.95 | 0.92 | 0.88 | 0.84 |
| | retention % | 100 | 77 | 74 | 71 | 68 |
| | tensile elongation (g/d) | 31.9 | 21.7 | 20.4 | 18.0 | 13.6 |
| | retention % | 100 | 68 | 64 | 56 | 43 |
| Com. Ex. 5 | tensile strength (g/d) | 1.35 | 1.23 | 1.18 | 1.20 | 1.01 |
| | retention % | 100 | 91 | 87 | 89 | 75 |
| | tensile elongation (g/d) | 27.8 | 16.2 | 15.2 | 16.2 | 16.7 |
| | retention % | 100 | 58 | 55 | 58 | 60 |
| Com. Ex. 6 | tensile strength (g/d) | 1.14 | 1.09 | 1.03 | 0.89 | 0.95 |
| | retention % | 100 | 96 | 90 | 78 | 83 |
| | tensile elongation (g/d) | 26.6 | 23.9 | 24.5 | 18.2 | 19.8 |
| | retention % | 100 | 90 | 92 | 68 | 74 |

It is apparent from Table 3 that the filaments according to Examples 9 and 10 show significantly high photodegradability with greater light-associated decrease in strength and elongation despite that the microfine anatase-type titanium oxide was incorporated with the rutile type titanium oxide therein, as compared with the filaments according to Comparative Examples 5 and 6, i.e. the filament without an anatase-type titanium oxide or the filament where a rutile type titanium oxide having a larger particle size was used.

5. A cellulose ester composition as claimed in claim 2, wherein said titanium oxide is treated with said component in a proportion of 0.01 to 20 parts by weight relative to 100 parts by weight of said titanium oxide.

6. A cellulose ester composition as claimed in claim 1, wherein said titanium has a transition metal, a noble metal or a compound of these metals supported thereon.

7. A cellulose ester composition comprising a cellulose ester and an anatase titanium oxide, wherein the surface of said titanium oxide is treated with at least one component selected from the group consisting of a phosphorus compound or a salt thereof, a polyhydric alcohol and an amino acid or a salt thereof.

8. A cellulose ester composition as claimed in claim 1, wherein said cellulose ester has an average degree of substitution of 1 to 2.8.

9. A cellulose ester composition as claimed in claim 1, wherein said cellulose ester is an ester of cellulose with an organic acid having 2 to 10 carbon atoms.

10. A cellulose ester composition as claimed in claim 1, wherein said cellulose ester is a cellulose acetate.

11. A cellulose ester composition as claimed in claim 1, which comprises 0.01 to 20 parts by weight of the titanium oxide relative to 100 parts by weight of the cellulose ester.

12. A cellulose ester composition as claimed in claim 1, which further comprises at least one ingredient selected from the group consisting of a plasticizer, an aliphatic polyester and a biodegradation accelerator.

13. A cellulose ester composition as claimed in claim 12, wherein said plasticizer is at least one compound selected from the group consisting of aromatic polycarboxylic acid esters inclusive of phthalic acid esters, aliphatic polycarboxylic acid esters, lower fatty acid esters of polyhydric alcohols, and phosphoric acid esters, said aliphatic polyester is a polyester having a molecular weight of 200 through $20 \times 10^4$, and said biodegradation accelerator is an organic acid or an ester thereof.

14. A cellulose ester composition as claimed in claim 1 comprising a plurality of cellulose esters varying in the degree of substitution, which comprises a cellulose ester having an average degree of substitution of not more than 2.15 in a proportion of not less than 10% by weight based on the total amount of said cellulose esters.

15. A cellulose ester composition comprising 0.1 to 10 parts by weight of an anatase titanium oxide relative to 100 parts by weight of a cellulose ester with an organic acid having 2 to 4 carbon atoms, wherein said titanium oxide has:
  (1) a specific surface area of not less than 50 m$^2$/g,
  (2) a primary particle size of 0.003 to 0.05 $\mu$m, or
  (3) a specific surface area of not less than 50 m$^2$/g and a primary particle size of 0.003 to 0.05 $\mu$m, and the surface of said titanium oxide is treated with at least one component selected from the group consisting of phosphorus compounds or salts thereof, polyhydric alcohols and amino acids or salts thereof.

16. A cellulose ester composition as claimed in claim 1, wherein said cellulose ester comprises a cellulose ester having an average degree of substitution of not more than 2.15 and being biodegradable.

17. A cellulose ester composition as claimed in claim 16, wherein said cellulose ester having an average degree of substitution of not more than 2.15 shows a 4-week decomposition rate of not less than 60% by weight as determined using the amount of evolved carbon dioxide as an indicator in accordance with ASTM D5209-91.

18. A cellulose ester composition as claimed in claim 1, wherein said cellulose ester has an equivalent ratio of residual alkali metal or alkaline earth metal to residual sulfuric acid in said cellulose ester of 0.1 to 1.1.

19. A cellulose ester composition as claimed in claim 1, wherein said cellulose ester is a cellulose ester having an average degree of polymerization of 50 to 250 and an average degree of substitution of 1.0 to 2.15, wherein an equivalent ratio of residual alkali metal or alkaline earth metal to residual sulfuric acid in said cellulose ester is 0.1 to 1.1.

20. A cellulose ester composition as claimed in claim 1, wherein said titanium oxide has:
  a primary particle size of 0.001 to 0.07 $\mu$m.

21. A shaped article comprising, as molded or formed, a cellulose ester composition which comprises a cellulose ester and an anatase titanium oxide, wherein
  said titanium oxide has:
    a specific surface area of 50 to 200 m$^2$/g.

22. A shaped article as claimed in claim 20, wherein said titanium oxide has:
  a primary particle size of 0.001 to 0.07 $\mu$m.

23. A fiber or fibrous article which comprises:
  a fiber of a cellulose ester composition comprising a cellulose ester and an anatase titanium oxide, wherein said titanium oxide has:
    a specific surface area of 50 to 200 m$^2$/g.

24. A fiber or fibrous article as claimed in claim 23, which comprises a cellulose ester fiber having an average degree of substitution of not more than 2.15 and being biodegradable.

25. A fiber or fibrous article as claimed in claim 24, wherein said biodegradable cellulose ester fiber shows a 4-week decomposition rate of not less than 60% by weight as determined using the amount of evolved carbon dioxide as an indicator in accordance with ASTM D5209-91.

26. A fiber or fibrous article as claimed in claim 23, wherein
  said titanium oxide has:
    a primary particle size of 0.001 to 0.07 $\mu$m.

27. A fiber or fibrous article as claimed in claim 23, wherein said fiber further comprises one or more other cellulose ester fibers varying in the degree of substitution.

28. A shaped article comprising, as molded or formed, a cellulose ester composition which comprises a cellulose ester and an anatase titanium oxide, wherein
  the surface of said titanium oxide is treated with at least one component selected from the group consisting of a phosphorus compound or a salt thereof, a polyhydric alcohol and an amino acid or a salt thereof.

29. A shaped article as claimed in claim 28, wherein said titanium oxide has:
  a specific surface area of 50 to 200 m$^2$/g.

30. A shaped article as claimed in claim 29, wherein said titanium oxide has:
  a primary particle size of 0.001 to 0.07 $\mu$m.

31. A fiber or fibrous article which comprises:
  a fiber of a cellulose ester composition comprising a cellulose ester and an anatase titanium oxide, wherein the surface of said titanium oxide is treated with at least one component selected from the group consisting of a phosphorus compound or a salt thereof, a polyhydric alcohol and an amino acid or a salt thereof.

32. A fiber or fibrous article as claimed in claim 31, wherein
  said titanium oxide has:
    a specific surface area of 50 to 200 m$^2$/g.

33. A fiber or fibrous article as claimed in claim 32, wherein
  said titanium oxide has:
    a primary particle size of 0.001 to 0.07 $\mu$m.

34. A fiber or fibrous article as claimed in claim 31, wherein said fiber further comprises one or more other cellulose ester fibers varying in the degree of substitution.

* * * * *